US012669399B2

(12) United States Patent
Mess et al.

(10) Patent No.: US 12,669,399 B2
(45) Date of Patent: Jun. 30, 2026

(54) SYSTEMS AND METHODS FOR FLUID LEAK DETECTION

(71) Applicant: StreamLabs, Inc., Whitehouse Statioin, NJ (US)

(72) Inventors: Francis McCarthy Mess, Atlanta, GA (US); Ian Kent, Atlanta, GA (US); Jorge Carlos Almirall, Atlanta, GA (US); Brian Gestner, Atlanta, GA (US); Samuel Hany Elia, Atlanta, GA (US)

(73) Assignee: StreamLabs, Inc., Whitehouse Station, NJ (US)

( * ) Notice: Subject to any disclaimer, the term of this patent is extended or adjusted under 35 U.S.C. 154(b) by 81 days.

(21) Appl. No.: 16/792,767

(22) Filed: Feb. 17, 2020

(65) Prior Publication Data

US 2020/0264068 A1 Aug. 20, 2020

Related U.S. Application Data

(60) Provisional application No. 62/807,183, filed on Feb. 18, 2019.

(51) Int. Cl.
*G01M 3/28* (2006.01)
*G05B 19/042* (2006.01)

(52) U.S. Cl.
CPC ........ *G01M 3/2876* (2013.01); *G01M 3/2815* (2013.01); *G05B 19/0428* (2013.01)

(58) Field of Classification Search
CPC ...................... G01M 31/2876; G01M 31/2815
USPC ........................................................... 73/46
See application file for complete search history.

(56) References Cited

U.S. PATENT DOCUMENTS

| | | | |
|---|---|---|---|
| 5,415,033 A * | 5/1995 | Maresca, Jr. ....... | G01M 3/2807 |
| | | | 73/40.5 R |
| 2017/0030798 A1 * | 2/2017 | DeVerse ................. | G06F 19/00 |
| 2017/0152648 A1 | 6/2017 | Hammond et al. | |
| 2017/0298597 A1 * | 10/2017 | Hammond .......... | G01M 3/2807 |
| 2018/0136673 A1 | 5/2018 | Halimi | |
| 2018/0291594 A1 * | 10/2018 | Hammond .............. | G01F 25/10 |

OTHER PUBLICATIONS

Foreign Search Report on PCT PCT/US2020/018527 dated Apr. 30, 2020.
Lee et al., "Leak location in pipelines using the impulse response function", Journal of Hydraulic Research, Apr. 26, 2010, retrieved on (Apr. 11, 2020]. Retrieved from the internet <https://www.tandfonline.com/doi/abs/10.1080/00221686.2007.9521800> entire document.

* cited by examiner

*Primary Examiner* — Peter J Macchiarolo
*Assistant Examiner* — Rodney T Frank
(74) *Attorney, Agent, or Firm* — Fish & Richardson P.C.

(57) ABSTRACT

According to at least one aspect, the present disclosure is directed to leak detection. There is pressure sensor for measuring pressure of fluid within a hollow structure, a shut-off valve for controlling fluid flow through the hollow structure, and a processor communicatively coupled to the pressure sensor and to the shut-off valve. The processor can acquire, from the pressure sensor, a first pressure measurement of the fluid while the shut-off valve is in an open state, and a second pressure measurement of the fluid while the shut-off valve is in a closed state. The processor can detect a fluid leak event based on the first and second pressure measurements.

21 Claims, 5 Drawing Sheets

*300*

*302*

Normal Flow?

YES

NO

| Obtain first pressure measurements while valve is open | *304* |

| Close the shut-off valve | *306* |

| Obtain second pressure measurements while the valve is closed | *308* |

| Open the shut-off valve | *310* |

*312*

Normal Flow?

YES

NO

| Obtain third pressure measurements after opening the valve | *314* |

| Check for leak event based on pressure measurements | *316* |

| Close the valve for a predefined time period | 402 |

| Open the valve | 404 |

| Obtain second flow rate measurements after opening the valve | 406 |

| Check for leak event based on first and second flow rate measurements | 408 |

SYSTEMS AND METHODS FOR FLUID LEAK DETECTION

CROSS-REFERENCE TO RELATES APPLICATIONS

This application claims priority to U.S. Provisional Application No. 62/807,183, entitled "SYSTEMS AND METHODS FOR FLUID LEAK DETECTION" and filed on Feb. 18, 2019, which is incorporated by reference herein in its entirety.

BACKGROUND

In a fluid distribution system, leaks or leak events can be due to defects in, or misuse of, the fluid distribution system. For instance, a leak can be caused by a defective (or broken) pipe, a loose fitting or a device (e.g., a tap, appliance or fixture) that is inadvertently left on, among others. Regardless of the respective cause, leaks are usually undesirable events that need to be detected and addressed as soon as possible. For example, water leaks can cause property damages (e.g., structural damages to buildings or damages to furniture, clothes or other property). Natural gas leaks can result in dangerous fires or explosions, human suffocation or a combination thereof. Also, fluid leaks usually result in fluid waste. Reliable and timely detection of fluid leak events can prevent losses in property and human lives.

SUMMARY

According to at least one aspect, a leak detection system can include a pressure sensor for measuring pressure of fluid within a hollow structure, a shut-off valve for controlling fluid flow through the hollow structure, and a processor communicatively coupled to the pressure sensor and to the shut-off valve. The processor can obtain, from the pressure sensor, a first pressure measurement of the fluid while the shut-off valve is in an open state. The processor can obtain a second pressure measurement of the fluid while the shut-off valve is in a closed state. The processor can detect a fluid leak event based on the first and second pressure measurements.

In some implementations, the processor can compare the first pressure measurement to the second pressure measurement, and can detect the fluid leak event upon determining that the first pressure measurement is greater than the second pressure measurement by a difference greater than a predefined threshold value. In some implementations, the processor can actuate the shut-off valve to switch to the closed state and block the fluid flow through the hollow structure after obtaining the first pressure measurement. The processor can obtain the second pressure measurement of the fluid after actuating the shut-off valve. In some implementations, the processor can obtain a plurality of second pressure measurements of the fluid while the shut-off valve is in the closed state. The processor can detect the fluid leak event based on a negative slope or a degree of decrease of the plurality of second pressure measurements over time. The processor can detect the fluid leak event based on one or more characteristics of a function associated with the plurality of second pressure measurements over time.

In some implementations, the processor can actuate the shut-off valve to switch to the open state and allow the fluid to flow through the hollow structure after obtaining the second pressure measurement. The processor can obtain a third pressure measurement of the fluid after causing the shut-off valve to switch to the open state. The processor can detect the fluid leak event based on the first, second and third pressure measurements. In some implementations, the processor can compare the first pressure measurement to the second pressure measurement, and compare the second pressure measurement to the third pressure measurement. The processor can detect the fluid leak event upon determining that (i) the first pressure measurement is greater than the second pressure measurement by a first difference greater than a first predefined threshold value and that (ii) the third pressure measurement is greater than the second pressure measurement by a second difference greater than a second predefined threshold value.

In some implementations, the processor can obtain a plurality of second pressure measurements of the fluid while the shut-off valve is in the closed state, and can obtain a plurality of third pressure measurements of the fluid after causing the shut-off valve to switch to the open state. The processor can detect the fluid leak event based on the first measurement, the plurality of second measurements and the plurality of third measurements. In some implementations, the processor can detects the fluid leak event based on a negative slope or a degree of decrease of the plurality of second pressure measurements over time and a positive slope or a degree of increase of the plurality of third pressure measurements over time. The processor can detect the fluid leak event based on one or more characteristics of a function associated with the plurality of second pressure measurements and the plurality of third pressure measurements over time.

In some implementations, the processor can actuate the shut-off valve to switch to the open state and allow the fluid to flow through the hollow structure after obtaining the second pressure measurement. The processor can obtain the first pressure measurement of the fluid after actuating the shut-off valve. In some implementations, the processor can obtain a plurality of first pressure measurements of the fluid while the shut-off valve is in the open state. The processor can detect the fluid leak event based on a positive slope or a degree of increase of the plurality of first pressure measurements over time. The processor can detect the fluid leak event based on one or more characteristics of a function associated with the plurality of first pressure measurements over time.

In some implementations, the processor can actuate the shut-off valve to switch to a second open state to allow the fluid to flow through the hollow structure after obtaining the second pressure measurement. The processor can obtain a plurality of fluid flow rate measurements after actuating the shut-off valve to switch to the second open state. The processor can estimate, using the plurality of fluid flow rate measurements, a fluid volume indicative of an amount of fluid flowing through the hollow structure after causing the shut-off valve to switch to the second open state. The processor can compare the fluid volume to a predefined fluid volume value. The processor can detect the fluid leak event further based on the comparison of the fluid volume to the predefined fluid volume value. In some implementations, the processor can checks for a normal fluid flow event before actuating the shut-off valve to switch to the closed state or after actuating the shut-off valve to switch to the second open state. The processor can proceed with detection of the fluid leak event upon determining absence of the normal fluid flow event.

According to at least one other aspect, a method for leak detection can include a pressure sensor generating a first pressure measurement of a fluid in a hollow structure while a shut-off valve is in an open state. The pressure sensor can generate a second pressure measurement of the fluid while the shut-off valve is in a closed state. The method can include a processor detecting a fluid leak event based on the first and second pressure measurements of the fluid.

In some implementations, the method can include the processor comparing the first pressure measurement to the second pressure measurement. The method can include the processor detecting the fluid leak event upon determining that the first pressure measurement is greater than the second pressure measurement by a difference greater than a predefined threshold value. In some implementations, the method can include the processor actuating the shut-off valve to switch to the closed state and block the fluid flow through the hollow structure after obtaining the first pressure measurement. The method can include the pressure sensor generating the second pressure measurement of the fluid after actuating the shut-off valve.

In some implementations, the method can include the pressure sensor generating a plurality of second pressure measurements of the fluid while the shut-off valve is in the closed state. The method can include the processor detecting the fluid leak event based on (i) a negative slope or a degree of decrease of the plurality of second pressure measurements over time, or (ii) based on one or more characteristics of a function associated with the plurality of second pressure measurements over time. In certain implementations, the method can include the processor actuating the shut-off valve to switch to the open state and allow the fluid flow through the hollow structure after obtaining the second pressure measurement. The method can include the pressure sensor generating a third pressure measurement of the fluid after causing the shut-off valve to switch to the open state. The method can include the processor detecting the fluid leak event based on the first, second and third pressure measurements. In some implementations, the method can include the processor comparing the first pressure measurement to the second pressure measurement. The method can include the processor comparing the second pressure measurement to the third pressure measurement. The method can include the processor detecting the fluid leak event upon (i) determining that the first pressure measurement is greater than the second pressure measurement by a first difference greater than a first predefined threshold value, and (ii) determining that the third pressure measurement is greater than the second pressure measurement by a second difference greater than a second predefined threshold value. In some implementations, the method can include the pressure sensor generating a plurality of second pressure measurements of the fluid while the shut-off valve is in the closed state. In some implementations, the method can include the pressure sensor generating a plurality of third pressure measurements of the fluid after causing the shut-off valve to switch to the open state. In some implementations, the method can include the processor detects the fluid leak event based on the first measurement, the plurality of second measurements and the plurality of third measurements. In some implementations, the method can include the processor detecting the fluid leak event upon determining a negative slope or a degree of decrease of the plurality of second pressure measurements over time and a positive slope or a degree of increase of the plurality of third pressure measurements over time. The method can include the processor detecting the fluid leak event based on one or more characteristics of a function associated with the plurality of second pressure measurements and the plurality of third pressure measurements over time.

In some implementations, the method can include the processor actuating the shut-off valve to switch to the open state and allow the fluid to flow through the hollow structure after obtaining the second pressure measurement. The method can include the pressure sensor generating the first pressure measurement of the fluid after actuating the shut-off valve. In some implementations, the method can include the pressure sensor generating a plurality of first pressure measurements of the fluid while the shut-off valve is in the open state. The method can include the processor detecting the fluid leak event (i) based on a positive slope or a degree of increase of the plurality of first pressure measurements over time, or (ii) based on one or more characteristics of a function associated with the plurality of first pressure measurements over time.

In some implementations, the method can include the processor actuating the shut-off valve to switch to a second open state to allow the fluid to flow through the hollow structure after obtaining the second pressure measurement. The method can include the pressure sensor generating a plurality of fluid flow rate measurements after actuating the shut-off valve to switch to the second open state. The method can include the processor estimating, using the plurality of fluid flow rate measurements, a fluid volume indicative of an amount of fluid flowing through the hollow structure after causing the shut-off valve to switch to the second open state. The method can include the processor comparing the fluid volume to a predefined fluid volume value. The method can include the processor detecting the fluid leak event further based on the comparison of the fluid volume to the predefined fluid volume value. In some implementations, the method can include the processor checking for a normal fluid flow event before actuating the shut-off valve to switch to the closed state or after actuating the shut-off valve to switch to the second open state. The method can include the processor proceeding with detection of the fluid leak event upon determining absence of the normal fluid flow event.

According to at least one other aspect, a leak detection system can include a fluid flow sensor for measuring a fluid flow parameter of a fluid in a hollow structure, a shut-off valve for controlling fluid flow through the hollow structure, and a processor that is communicatively coupled to the fluid flow sensor and to the shut-off valve. The processor can cause the shut-off valve to be in a closed state for a predefined time period. The processor can actuate the shut-off valve to switch to an open state upon the predefined time period lapsing. The processor can determine, using a plurality of signals from the fluid flow sensor, a plurality of measurements of the fluid flow parameter after causing the shut-off valve to switch to the open state. The processor can detect a fluid leak event based on the plurality of measurements of the fluid flow parameter and a first volume associated with at least one of an expansion tank or one or more pipes located downstream of the hollow structure.

In some implementations, the processor can determine, using the plurality of measurements of the fluid flow parameter, a second volume of fluid flowing through the hollow structure after actuating the shut-off valve to switch to the open state. The processor can compare the second volume to the first volume. The processor can detect the fluid leak event upon determining that a difference between the first volume and the second volume is less than a predefined threshold value.

In some implementations, the processor can check for a normal fluid flow event before causing the shut-off valve to be in the closed state or after actuating the shut-off valve to switch to the open state. The processor can proceed with detection of the fluid leak event upon detecting absence of the normal fluid flow event. The fluid flow parameter can include fluid flow rate. The fluid flow parameter can includes fluid flow velocity. The fluid flow sensor can include an ultrasonic fluid flow sensor.

According to at least one other aspect, a method for leak detection can include a leak detection system maintaining a shut-off valve in a closed state for a predefined time period. The method can include the leak detection system actuating the shut-off valve to switch to an open state upon the predefined time period lapsing. The method can include the leak detection system determining, using a plurality of signals from a fluid flow sensor, a plurality of measurements of the fluid flow parameter after causing the shut-off valve to switch to the open state. The method can include the leak detection system detecting a fluid leak event based on the plurality of measurements of the fluid flow parameter and a first volume associated with at least one of an expansion tank or one or more pipes located downstream of the hollow structure.

In some implementations, the method can include the leak detection system determining, using the plurality of measurements of the fluid flow parameter, a second volume of fluid flowing through the hollow structure after actuating the shut-off valve to switch to the open state. The method can include the leak detection system comparing the second volume to the first volume. The method can include the leak detection system detecting the fluid leak event upon determining that a difference between the first volume and the second volume is less than a predefined threshold value.

In some implementations, the method can include the leak detection system checking for a normal fluid flow event before causing the shut-off valve to be in the closed state or after actuating the shut-off valve to switch to the open state. The method can include the leak detection system proceeding with detection of the fluid leak event upon detecting absence of the normal fluid flow event. The fluid flow parameter can include fluid flow rate. The fluid flow parameter can include fluid flow velocity. The fluid flow sensor can include an ultrasonic fluid flow sensor.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The accompanying drawings, which are incorporated in and constitute a part of this specification, illustrate embodiments of the disclosed technology and together with the description serve to explain principles of the disclosed technology.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatus, and systems for leak detection in a fluid distribution system. The various concepts introduced above and discussed in greater detail below may be implemented in any of numerous ways, as the described concepts are not limited to any particular manner of implementation. Specific implementations and applications are provided primarily for illustrative purposes.

Leak detection can be achieved through sensing of one or more characteristics of fluid flowing within a fluid distribution system (e.g., water distribution system or natural gas distribution system. For instance, measurements of fluid flow rate, total fluid volume, fluid pressure or other fluid flow parameters can be used to detect leak events. However, reliable fluid leak detection poses multiple technical challenges. First, leak events can happen in a variety of forms, for example, in terms of the respective fluid leak rate or intensity, timing, location or a combination thereof. For example, the fluid leak rate can vary depending on the nature of the defect (e.g., how wide is a pipe crack or how loose is pipe fitting) or human act (e.g., which device was left) causing the leak. Second, from the perspective of fluid flow signatures, leak events may not be easily distinguishable from normal fluid flow events. For example, a leak due to a pipe burst may generate a fluid flow rate similar to that generated by a sink or tub flow event. Finally, leak detection systems may end up being abandoned or deactivated by users if they trigger too many false alarms to the point where their use becomes an inconvenience to users.

Systems, apparatuses and methods described herein allow for addressing these technical challenges. Specifically, the systems, apparatuses and methods described herein can include measuring fluid pressure or fluid flow rate/velocity at different states of a shut-off valve and using the obtained measurements to detect leak events. Using different states of a shut-off valve can help observe the variation of the obtained measurements overtime when the shut-off valve is in open state or in closed state. Also, shutting off the valve and opening it again can allow for estimating the amount of fluid lost due to a potential leak event. Furthermore, combining different sensor data (e.g., pressure measurements and flow rate measurements) can increase the leak detection reliability.

Figure 1A:
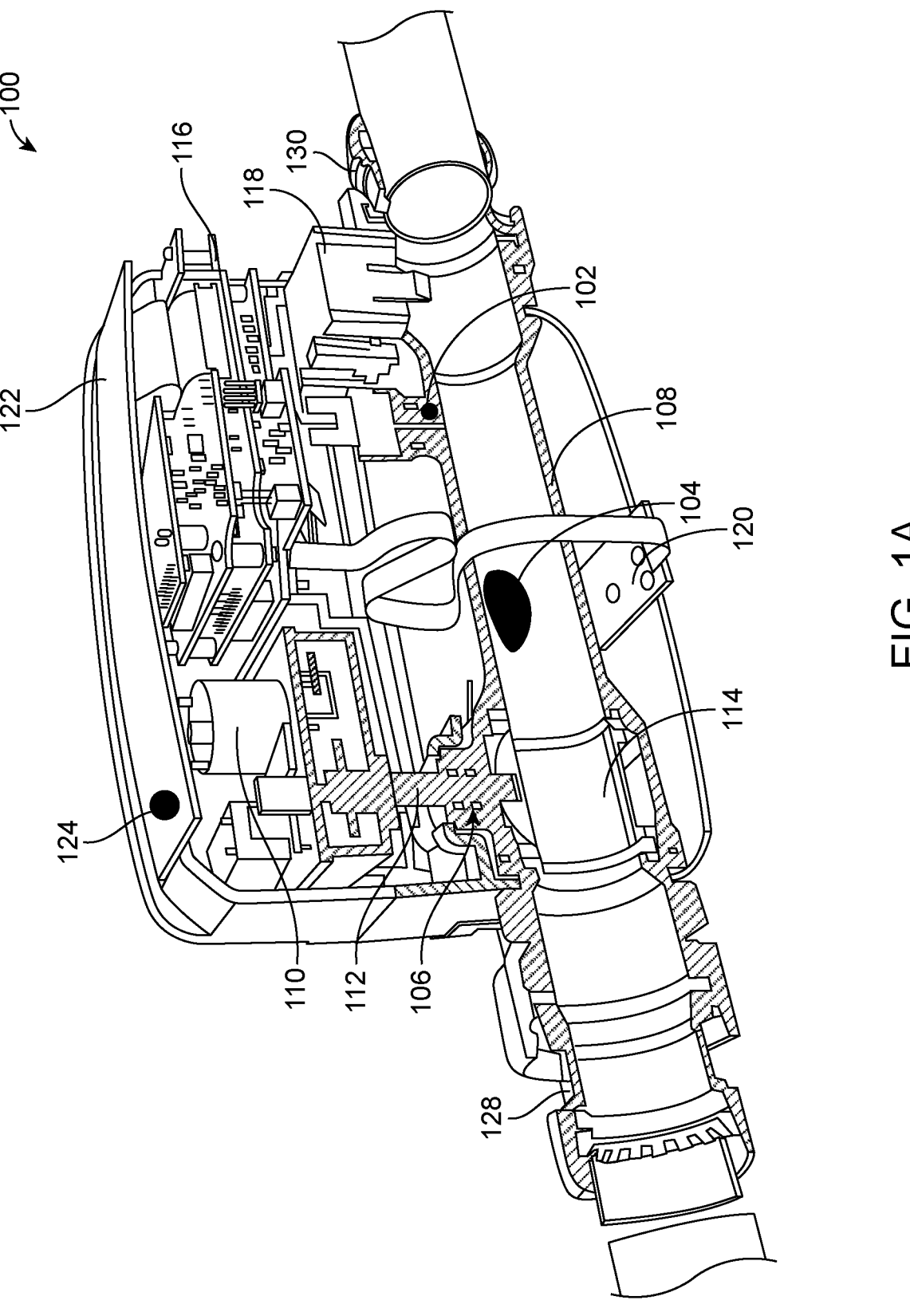
FIGS. 1A-1C show diagrams depicting a fluid flow monitoring and leak detection device, according to example embodiments of the current disclosure.
Figure 1B:
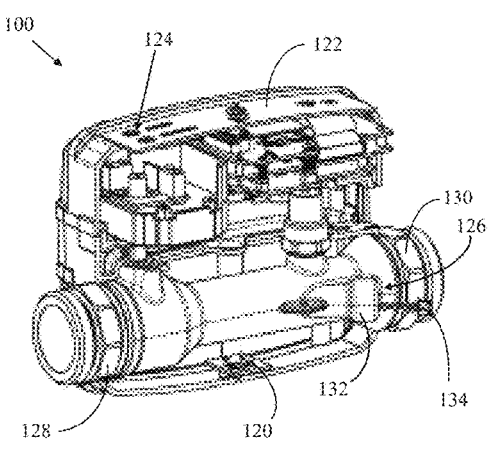
Figure 1C:
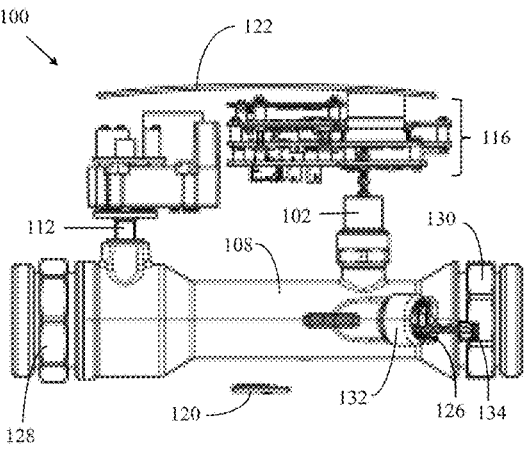

FIGS. 1A-1C show multiple diagrams depicting an example leak detection device 100 according to example embodiments of the current disclosure. The leak detection device 100 can include a pressure sensor 102, an ultrasonic flow sensor 104 and a shut-off valve 106. The pressure sensor 102, the ultrasonic flow sensor 104 and the shut-off valve 106 can be placed or fixed in connection with a plumbing tailpiece 108. In general, the pressure sensor 102, the ultrasonic flow sensor 104 or the shut-off valve 106 can be secured to (or arranged in connection with) a hollow structure, such as the plumbing tailpiece 108, a pipe, a fitting or the like. The shut-off valve 106 can include an electric motor 110, a shaft 112 and a valve ball 114 mechanically coupled to the shaft 112. The leak detection device 100 can include electric circuitry 116 and a power override box 118 electrically coupled to the electric circuitry 116. The leak detection device 100 can include a temperature and/or humidity sensor 120. The leak detection device 100 can include a housing 122 that encloses the electric motor 110, the valve shaft 112, the electric circuitry 116, the power override box 118, the temperature and/or humidity sensor 120 and a portion of the plumbing tailpiece 108. The housing 122 can include a switch 124 to turn the leak detection device 100 or the corresponding on and off, or actuate the shut-off valve 106 to close or open. The ultrasonic flow sensor 104 can include a pair of ultrasonic transducers 126 arranged opposite to each other across a longitudinal axis of the plumbing tailpiece 108. The leak detection device 100 can include a pair of pipe connectors (or pipe fittings) 128 and 130 for coupling the plumbing tailpiece 108 to pipes in a fluid distribution system.

The electric circuitry 116 can include (or can be arranged into) a plurality of circuit boards. The circuit boards can include a processor, a memory, a microcontroller, a radio interface, an analog-to-digital converter (ADC) or a combination thereof (not shown in FIGS. 1A-1C). The microcontroller can control the electric motor 110. Specifically, the microcontroller can actuate the electric motor to cause the valve shaft 112 to rotate in one direction or another. The shaft 112 can be mechanically coupled to the electric motor 110 via a plurality of gears. As the shaft rotates it causes the valve ball 114 to rotate too. The valve ball 114 can include a hole that extends through the valve ball 114. When the hole is aligned with longitudinal axis of the plumbing tailpiece 108, the shut-off valve 106 is in an open state and fluid can flow through the valve ball 114. When the hole is perpendicular to the longitudinal axis of the plumbing tailpiece 108, the shut-off valve 106 is in a closed state and fluid can be blocked (or prevented) from flowing through the plumbing tailpiece 108.

The processor can be communicatively coupled to the pressure sensor 102, the flow sensor 104, the microcontroller, the radio interface or a combination thereof. For instance, the processor can send signals or instructions to the microcontroller to command actuation of the electric motor 110 and cause the shut-off valve 106 to close (e.g., switch to closed state) or open (e.g., switch to open state). The processor can actuate the pressure sensor or the ultrasonic flow sensor to generate fluid pressure measurements or fluid flow rate (or velocity) measurements, respectively. The processor can receive (or obtain) fluid pressure measurements from the pressure sensor, fluid flow rate measurements from the ultrasonic flow sensor 104 or both, and use such measurements to detect leak events. Specifically, the processor can execute computer code instructions to perform any of the methods described herein. The computer code instructions can be stored in the memory. The processor may also receive temperature or humidity measurements from the temperature and/or humidity sensor 120. The processor can also cause the radio interface to communicate with remote devices.

The ultrasonic flow sensor can measure fluid flow rate (or fluid flow velocity) of the fluid flowing through (or in) the plumbing tailpiece 108. The plumbing tailpiece 108, or the hollow structure, can include a pair of tubular segments 132, for example, arranged apposite to each other across the longitudinal axis of the plumbing tailpiece 108. The tubular segments 132 can form tubular openings into the plumbing tailpiece 108 with respective longitudinal axes that are aligned with each other. The longitudinal axes of the tubular segments 132 (or of the respective tubular openings) can be arranged at an angle (e.g., 30°, 45°, 60° or other angle between 0° and 90°) with respect to the longitudinal axis of the plumbing tailpiece 108. Each tubular segment 132 can house a respective ultrasonic transducer 126 such that the ultrasonic transducers 126 are facing each other. Each ultrasonic transducer 126 can be communicatively coupled to the electric circuitry 116 (or the processor), for example, via respective electric wires 134. The processor can cause one ultrasonic flow sensor 126 to transmit ultrasonic signals to propagate through the fluid to the other ultrasonic transducer 126. Each of the ultrasonic transducers 126 can act as a transmitter, a receiver or both (e.g., by alternating between transmitting and receiving ultrasonic signals). In some implementations, the ultrasonic transducers may be arranged according to a different configuration with respect the plumbing tailpiece 108 (or the hollow structure in general). In some implementations, the hollow structure can include a plurality of hollow structures secured (or coupled) to one another.

While FIGS. 1A-1C illustrate an invasive placement of the ultrasonic transducers 126, non-invasive placements are also contemplated by the current disclosure. For instance, the ultrasonic transducers 125 can be mounted on the outer surface of the plumbing tailpiece 108. Also, while the leak detection device 100 of FIGS. 1A-1C employs an ultrasonic flow sensor 104, other types of flow sensors are contemplated by the current disclosure. For example, the leak detection device 100 can include a paddlewheel flow sensor, a magnetic flow sensor or a turbine flow meter among others. The pressure sensor 102 (e.g., pressure transducer) can be arranged in a respective opening of the plumbing tailpiece 108, and can be in contact with the fluid to measure the respective fluid pressure.

The housing 122 can enclose various components of the leak detection device 100. For instance, the housing 122 can enclose the pressure sensor and components thereof, the flow sensor and components thereof, the shut-off valve and components thereof, the electric circuitry 116, the temperature and/or humidity sensor 120 and a substantial portion of the plumbing tailpiece 108. The pipe connectors 128 and 130 can be located outside the housing 122 to allow coupling with pipes of the fluid distribution system. The housing 122 can include the switch 124 (e.g., a membrane switch) to allow manual activation or deactivation of the leak detection device 100 or the corresponding shut-off valve 106. In some implementation, the leak detection device (or system) 100 can include a plurality of devices.

Figure 2:
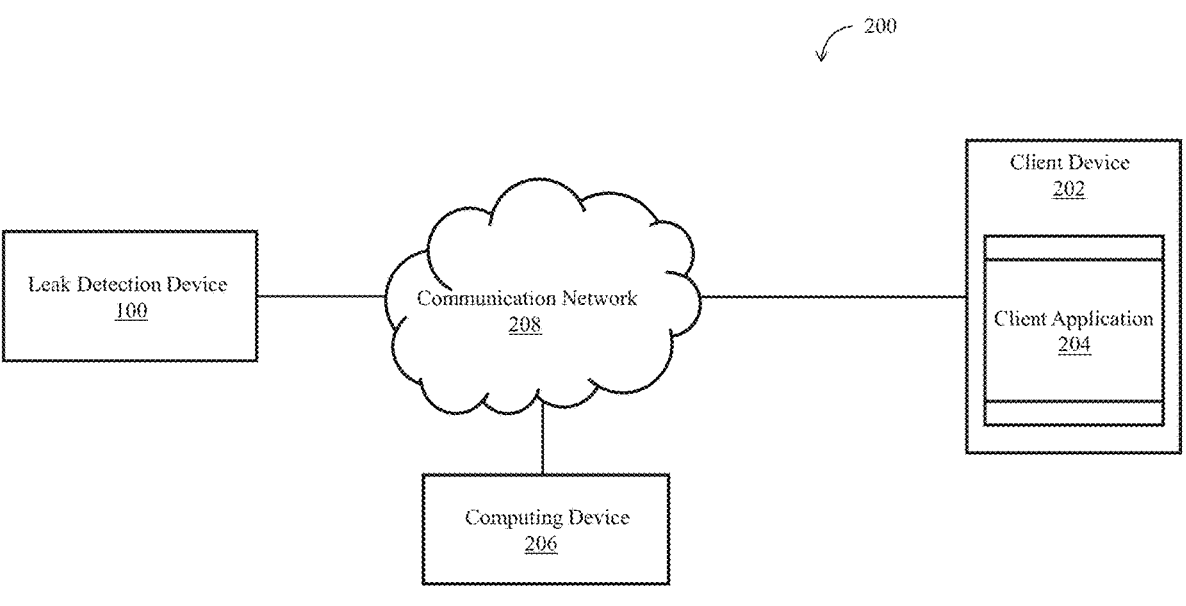
FIG. 2 shows a flowchart illustration a leak detection environment, according to example embodiments of the current disclosure.

FIG. 2 shows a block diagram illustrating an environment for fluid leak detection and management 200. The environment 200 can include the leak detection device (or system) 100, one or more client devices 202 with a client application 204 executing thereon, one or more computing devices 206 or a combination thereof. The leak detection device 100 can be communicatively coupled to the client device(s) 202 and/or the computing device 206 via a communication network 208. The communication network 208 can include a wired network, a wireless network, a local area network, a wide area network, an optical network or a combination thereof. The leak detection device (or system) 100 can transmit or receive signals (or data) to, or from, the client device(s) 202 or the computing device(s) 206 via the respective radio interface (or other communication interface) and the communication network 208. The computing device(s) 206 can include a computer server managing (or communicating with) the client application 204 running on the client device(s) 202. The computing device 206 can communicate with other remote devices or systems, such as computer systems or devices associated with a water utility company, a natural gas utility company or fire department among others.

The leak detection device (or system) 100 can communicate fluid flow rate measurements (e.g., fluid flow rate or cumulative fluid usage data), pressure measurements, temperature and/or humidity measurements or a combination thereof to the computing device(s) 206 or the client device 202. The leak detection device (or system) 100 can communicate information indicative of triggering of (or on-going) leak detection processes to the computing device(s) 206 or the client device 202. For instance, upon initiating or immediately prior to initiating a leak detection process, such as the leak detection method 300 of FIG. 3 or the leak detection method 400 of FIG. 4, the leak detection device 100 can transmit an indication of such process to the client device 202, for example, either directly or via the computing device(s) 206. The client application 204 can display a message to the user of the client device 202 indicating the start of the leak detection process by the leak detection device 100. The leak detection device 100 can also send an indication of the termination of the leak detection process to the client device 202, and the client application 204 can display a process termination message to the user of the client device 202. The leak detection device 100 can also send alerts indicative of detected leak events to the computing device(s) 202 and/or the computing device(s) 206.

The leak detection device (or system) 100 can query the client device 202 regarding existence or absence a normal fluid flow event prior to or during execution of a leak detection process. For example, before starting a leak detection process, the leak detection device (or system) 100 can query the client device 202 regarding any normal fluid flow event. If the client device 202, or the respective client application 204, confirms that no normal fluid flow event is currently occurring, the leak detection device (or system) 100 can proceed with the leak detection process, otherwise the leak detection device (or system) 100 can abort the leak detection process. The leak detection device (or system) 100 can send the query (or another query) during the leak detection process to the client device 202 or the corresponding instance of the client application 204. For example, after actuating the shut-off valve to switch from closed state to an open state, the leak detection device (or system) 100 can check whether any normal fluid flow event is occurring. The leak detection device (or system) 100 can proceed with the leak detection process if there is no normal fluid flow event, otherwise abort the leak detection process.

Figure 3:
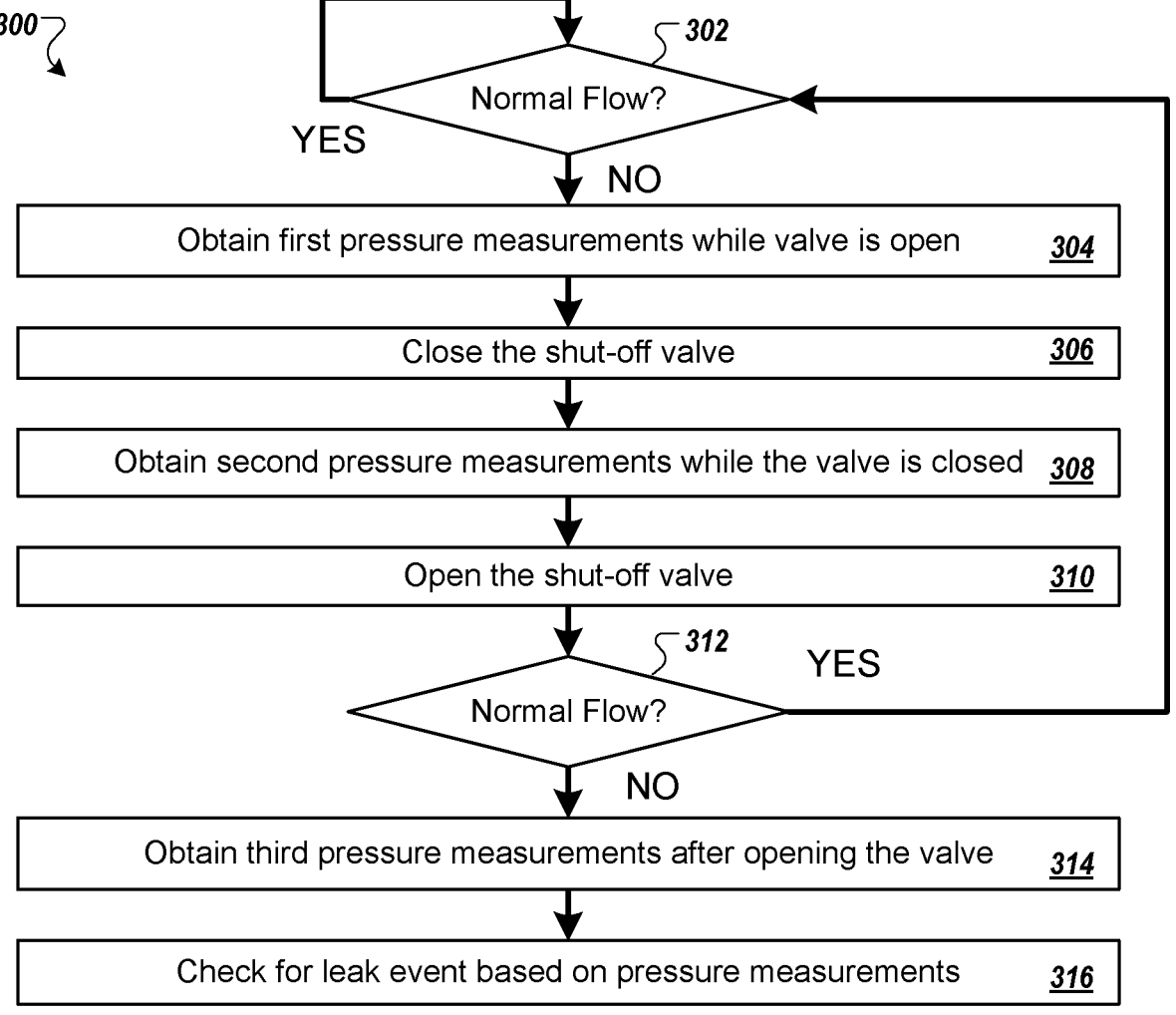
FIG. 3 is a flow chart illustrating a leak detection method based on fluid pressure measurements, according to example embodiments of the current disclosure.

FIG. 3 shows a flowchart illustrating a leak detection method 300 using pressure data. The method 300 can include checking for normal fluid flow (DECISION BLOCK 302) and obtaining first pressure measurements while the shut-off valve is open (ACT 304). The method 300 can include closing the shut-off valve (ACT 306) and obtaining second pressure measurements while the shut-off valve is closed (ACT 308). The method 300 can include opening the shut-off valve (ACT 310), checking for normal flow (DECISION BLOCK 312) and obtaining third pressure measurements after opening the shut-off valve (ACT 314). The method 300 can include checking for a leak event based on the first, second and third pressure measurements (ACT 316).

The method 300 can include the leak detection device 100 (or the corresponding processor) checking for normal fluid flow (DECISION BLOCK 302). For example, upon deciding to check for leak events, the processor can trigger the flow sensor 104 to generate one or more fluid flow measurements (e.g., flow rate or flow velocity measurements) and receive such measurements from the flow sensor 104. The processor can determine whether the received flow measurements are indicative of a normal fluid flow event. As used herein, a normal fluid flow event can refer to a deliberate flow event that is driven by a device (e.g., an appliance or a fixture among others) connected to a fluid distribution system (e.g., water distribution system or natural gas distribution system among others). Leak events and zero-flow events can be viewed as not part of normal flow events. Normal fluid flow events can be referred to herein as fluid usage events. A leak event can refer to a fluid flow event driven by a pipe crack (or fissure), a loose fitting, or a device (e.g., an appliance or fixture) connected to the fluid distribution system that was inadvertently left open or activated. The processor can use device fluid flow signatures, fluid flow rate (or fluid flow velocity) threshold values, fluid flow event duration or a combination thereof to determine presence or existence of a fluid usage event (or normal fluid flow event).

For example, a relatively low fluid flow rate, e.g., smaller than a predefined threshold value, measured by the fluid flow sensor 102 can be indicative of a zero-flow event. For example, a relatively small fluid flow rate measurement can represent an offset value indicative of a measurement error of the fluid flow meter rather than actual fluid flow event. The processor can compare a measured fluid flow rate event to a device signature (or a signature for a combination of devices) and if there is no match with any of the signatures, the leak detection device (or system) 100 can determine absence of a fluid usage event. As discussed above with regard to FIG. 2, the leak detection device (or system) 100 can determine absence or presence of a fluid usage event based on information received from the client device 202 or the corresponding instance of the client application 204. The leak detection device (or system) 100 can determine absence or presence of a fluid usage event based on a combination of techniques described above.

The leak detection device 100 (or the respective processor) can send an indication or instruction for triggering the method 300 to the client device 202, and the client device 202 can respond back, for example, to abort execution of the method 300 or to indicate that a normal flow event (or fluid usage event) is on-going. Upon detecting a normal flow event at DECISION BLOCK 302, the leak detection device 100 can abort or delay start of the method 300. For example, the leak detection device can check at a later time whether the normal flow event is over. Upon determining that no normal flow event is on-going, the leak detection device 100 (or the respective processor) can proceed with execution of other steps of method 300.

The method 300 can include the leak detection device 100 or the respective processor obtaining one or more first pressure measurements while the shut-off valve 106 is open (ACT 304). The processor can trigger the pressure sensor 102 to generate one or more fluid pressure measurements while the shut-off valve 106 is in the open state. The pressure sensor 102 can provide the pressure measurement(s) to the memory or the processor. The pressure measurements can be indicative of fluid pressure inside the plumbing tailpiece 108 (e.g., downstream of the shut-off valve 106) while the shut-off valve 106 is in the open state.

The method 300 can include the leak detection device 100 (or the respective processor) actuating the shut-off valve 106 to switch to a close state (ACT 306) and obtaining one or more second pressure measurements while the shut-off valve 106 is in close state (ACT 308). The processor can command the microcontroller to shut the valve 104, and the microcontroller can actuate the motor 124 to cause rotation of the shut-off valve 104 to switch to the closed state. The processor can maintain the shut-off valve 106 in the closed state for a predefined period of time before actuating the shut-off valve 106 to the open state at step 310. The predefined time period can be selected (or defined) to be long enough to lead a substantial drop in fluid volume in the pipes and/or expansion tank downstream of the leak detection device 100 if there is a leak event. For example, the processor can maintain the shut-off valve 106 in the close state for two minutes, five minutes, 10 minutes, 15 minutes, 20 minutes or other time duration. During the time period while the shut-off valve is in the close state, any leak event can cause the fluid in an expansion tank (not shown in FIGS. 1A-1C) and/or pipes of the fluid distribution system that are downstream of the shut-off valve 106 to decrease over time. As the volume of the fluid in the pipes and/or expansion tank decreases so does the fluid pressure. However, if there is no leak event, the fluid volume and the fluid pressure will stay the same over the period of time during which the shut-off valve 106 is maintained in the close state.

After closing the shut-off valve 106, the processor can trigger (or instruct) the pressure sensor 102 to generate or obtain one or more second pressure measurements. The pressure sensor 102 can provide the second pressure measurement(s) to the memory or the processor. The second pressure measurement(s) represent fluid pressure inside the plumbing tailpiece 108 (or inside the hollow structure) while the shut-off valve 106 is at closed state. A leak event downstream of the shut-off valve 106 will result in a decrease in the one or more second pressure measurements compared to the first pressure measurement. The pressure sensor 102 can generate a sequence of second fluid pressure measurements over the time period during which the shut-off valve 106 is kept in the close state. In this case, the sequence of second fluid pressure measurements can depict a negative slope (or a degree or rate of decrease in fluid pressure) over time, for example, reflecting a continuous decrease in the fluid pressure as the leak event drains out the fluid in the pipes and/or expansion tank.

The method 300 can include the leak detection device 100 or the respective processor actuating the shut-off valve 106 to switch to the open state (ACT 310). At the end of the predefined time period, the processor can command the microcontroller to actuate the electric motor 110 to cause the shut-off valve 106 to rotate and switch to the open state again. In the presence of a fluid leak event, opening the shut-off valve 106 can lead to a relatively high fluid flow rate to make up for the fluid lost (downstream of the shut-off valve 106) during the time period when the shut-off valve 106 was in close state.

The method 300 can include the leak detection device 100, or the respective processor, checking for normal fluid flow or fluid usage (DECISION BLOCK 312). Once the shut-off valve 106 is open, the processor may check again for normal fluid flow events or fluid usage events (DECISION BLOCK 312). The processor can use any of the techniques discussed above with regard to FIG. 2 or DECISION BLOCK 302. For example, the processor can use fluid flow measurements from the flow sensor 104 or data received from the client device(s) 202 to determine presence or absence of a normal fluid flow event or fluid usage event. The leak detection device 100 may keep checking for normal flow events while the method 300 is being executed. The leak detection device 100 may abort execution of the method 300 at any point when a normal fluid flow event (or fluid usage event) is detected. If no normal flow event is detected, the processor can proceed (at DECISION BLOCK 312) with execution of the rest of steps of method 300.

The method 300 can include the leak detection device 100, or the respective processor, obtaining one or more third pressure measurements after actuating the shut-off valve 106 to switch to the open state (ACT 314). After causing the shut-off valve 106 to switch to the open state, the processor may instruct the pressure sensor 102 to generate one or more third pressure measurements (ACT 314). The third pressure measurement(s) can represent fluid pressure downstream of the shut-off valve 106 after opening the shut-off valve 106. In the presence of a leak event, fluid may flow downstream after opening the shut-off valve 106 to make up for the fluid lost due to leakage during the time period when the shut-off valve 106 was in the close state. The fluid flow can lead to gradual or sudden increase of fluid pressure. The processor (or the pressure sensor 102) may wait for a predefined time duration (e.g., 30 seconds, one minute, or few minutes, among others) after opening the valve 106 to generate the third pressure measurement(s). The pressure sensor 102 may generate a sequence of third pressure measurements over time after opening the shut-off valve 106 during a predefined time period (e.g., 30 seconds, one minute, or few minutes, among others).

While method 300 is described to include obtaining the first, second and third pressure measurements, other implementations of method 300 can include obtaining the first and second (but not the third) pressure measurements or obtaining the second and third (but not the first) pressure measurements. For example, the leak detection device 100 or the respective pressure sensor 102 can generate one or more first pressure measurements at step 304, generate one or more second pressure measurements at step 308, and omit steps 310-314 of FIG. 3. According to another example, the leak detection device 100 or the respective pressure sensor 102 can omit step 304 of FIG. 3, generate one or more second pressure measurements at step 308 and generate one or more third pressure measurements at step 314. Also, the leak detection device 100 or the respective processor may omit DECISION BLOCK 302 and/or DECISION BLOCK 312. For example, the leak detection device 100 can inform the client device 102 of the start of execution the leak detection method 300, and proceed with the execution as long as no abort command is received from the client device 102.

The method 300 can include the processor determining whether a leak event exists based on at least a subset of the first, second and third pressure measurements (ACT 316). For example, if only the first and second pressure measurements are obtained by the leak detection device (or system) 100, the processor can compare the first pressure measurement to the second pressure measurement. The processor can detect a fluid leak event upon determining that the first pressure measurement is greater than the second pressure measurement. In some implementations, the processor can detect a fluid leak event upon determining that the first pressure measurement is greater than the second pressure measurement by a difference greater than a predefined threshold value. The use of a predefined threshold value can enhance leak detection reliability and reduce false alarms. The predefined threshold value can be determined using testing data, the time interval between the closing of the shut-off valve 106 (ACT 306) and the generating of the second pressure measurement, parameters (e.g., volume or architecture parameters) of the pipes and/or expansion tank located downstream of the shut-off valve 106, or a combination thereof.

The processor can obtain a plurality (or a sequence) of second pressure measurements of the fluid while the shut-off valve 106 is in the closed state. The processor can compute (e.g., using a line fitting approach) a slope of the sequence of second pressure measurements. The processor can detect a fluid leak event upon determining a negative slope (or a degree of decrease) of the sequence of second pressure measurements over time. In some implementations, the processor can detect a fluid leak event upon determining a negative slope (or a degree of decrease) of the sequence of second pressure measurements that is smaller than a pre-defined (or threshold) negative slope value. The processor can determine a curve (or function) defining the sequence of second pressure measurements, and analyze one or more characteristics (e.g., shape, slopes, etc.) of the function. The processor can detect a fluid leak event based on the one or more characteristics of the function associated with the plurality of second pressure measurements over time. For example, the processor can compare the curve associated with the second plurality of pressure measurements with one or more predefined template functions associated with various testing leak events. The processor can detect a leak event if a match with one of the template functions is found. The processor can detect a leak event based on a shape (e.g., a shape indicative of a negative slop within a given slope range) of the curve (or function) determined based on the sequence of second pressure measurements.

In the case where the leak detection device (or system) acquires the first, second and third pressure measurements, the processor can detect the fluid leak event based on the first, second and third pressure measurements. For example, the processor can compare the first pressure measurement to the second pressure measurement, and compare the second pressure measurement to the third pressure measurement. The processor can detect a fluid leak event upon determining that the first pressure measurement is greater than the second pressure measurement and the third pressure measurement is greater than the second pressure measurement. In some implementations, the processor can detect a fluid leak event upon determining that (i) the first pressure measurement is greater than the second pressure measurement by a first difference greater than a first predefined threshold value, and (ii) the third pressure measurement is greater than the second pressure measurement by a second difference greater than a second predefined threshold value. The first and second threshold values can be equal to one another or different from one another. The first and second threshold values can be determined, for example, based on testing data. The use of the first and second threshold values can help reduce false alarms, for example, due to sensor error measurements.

The processor can acquire a plurality (or a sequence) of second pressure measurements of the fluid at step 308 while the shut-off valve is in the closed state, and a plurality (or sequence) of third pressure measurements of the fluid at step 314 after causing the shut-off valve to switch to the open state again. In such a case, the processor can detect the fluid leak event based on the first measurement, the plurality of second measurements and the plurality of third measurements. For example, the processor can detects the fluid leak event based on a negative slope or a degree of decrease of the plurality of second pressure measurements over time and a positive slope or a degree of increase of the plurality of third pressure measurements over time. The processor can use, for example, line fitting methods to compute a first slope for the sequence of second pressure measurements and a second slope for the sequence of third pressure measurements. The processor can then determine whether the first slope is a negative slope and whether the second slope is a positive slope. The processor can determine (or identify) a function or curve representing the plurality of second pressure measurements and the plurality of third pressure measurements. The processor can use one or more characteristics of the identified function (e.g., slopes, shape, maximum value, minimum value, etc.) to determine presence or absence of a fluid leak event. For example, the processor can compare the characteristics of the identified function to corresponding characteristics of one or more predefined template functions.

In the case where only the second and third pressure measurements are acquired, the processor can detect a fluid leak event upon determining that the third pressure measurement is greater than the second pressure measurement (e.g., by a predefined threshold value). In some implementations, the leak detection device (or system) 100 can acquire a plurality of third pressure measurements of the fluid at step 314 while the shut-off valve is in the open state. The processor can detect the fluid leak event upon determining a positive slope or a degree of increase of the plurality of third pressure measurements over time. The processor can determine or identify a function or curve using the third pressure measurements (e.g., a curve that fits best the third pressure measurements). The processor can detect a fluid leak event, for example, by comparing on one or more characteristics of the identified function or curve to corresponding predefined characteristics associated with tested leak events.

The processor may use historic or simulation data indicative of, for example, recorded pressure measurements during simulated or past actual leak events or respective character-istics or features (e.g., normalized pressure functions, shapes of pressure functions, slopes of pressure functions, among others) in detecting leak events. The processor can compare features of measured pressure values to corresponding fea-tures of the historic or simulation data. If a match (e.g., within a predefined error margin) is found, the processor can determine that a leak event exists.

In some implementations, the processor can use fluid flow rate (or velocity) measurements, together with the fluid pressure measurements to detect presence of fluid leak events. For example, at step 314, the leak detection device (or system) 100 can acquire a plurality of fluid flow rate (or fluid flow velocity) measurements. The processor can use the fluid flow rate (or velocity) measurements to determine or estimate an amount of fluid (e.g., volume) that flew downstream after opening the shut-off valve at 310. The processor can compare the fluid volume to a predefined fluid volume value. The predefined volume value can be deter-mined based on a volume of an expansion tank and/or pipes downstream of the shut-off valve 106. If the measured amount of fluid is equal to (e.g., within a margin of error or within threshold difference value) the predefined volume value, then the processor can interpret that as an additional indicator (or evidence) of a fluid leak event. In other words, the match between the amount of fluid and the predefined volume value can indicate that a leak event drained the expansion tank and/or the pipes from fluid, and the expan-sion tank and/or the pipes were filled again after opening the valve at step 310. The processor can check for a normal fluid flow event (or fluid usage) as discussed with regard to DECISION BLOCKs 302 and 312 when using fluid flow measurements for leak detection. The use of measurements of fluid flow rate or fluid flow velocity for leak detection is discussed in further detail in FIG. 4 below.

Upon detecting a leak event, the processor may cause the shut-off valve 106 to close. Automatically closing the shut-off valve 106 upon detection of a leak event can prevent or mitigate any damages typically caused by fluid leaks, especially if the dwelling or premise where the leak event is detected is vacant and no one is there to take proper action. The leak detection device 100 (or the respective processor) can send a leak alert to the client device(s) 202, the computing device 206 or both. In the case of a false positive, a user of the client device 202 can manually open the shut-off valve 106 (e.g., via switch 124), or can inform the leak detection device 100, via the client application 204, the detected leak event is a false positive. In response, the leak detection device 100 may automatically open the shut-off valve 106 or execute the method 300 once again.

Figure 4:
FIG. 4 is a flowchart illustrating another leak detection method, according to example embodiments of the current disclosure.
Figure 4:
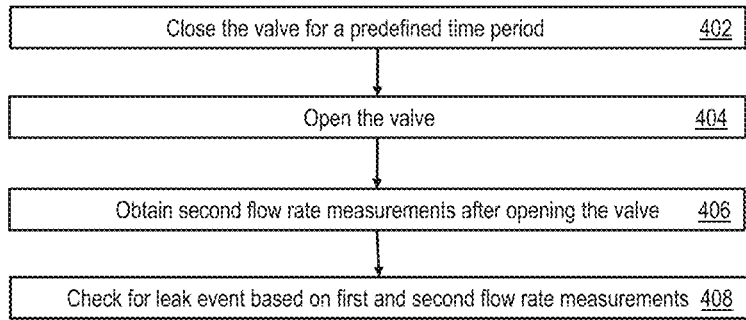

FIG. 4 is a flowchart illustrating a leak detection method 400 using fluid flow data. The method 400 can include closing the shut-off valve for a predefined time period (ACT 402) and opening the shut-off valve again after the lapsing of the predefined time period (ACT 406). The method 400 can include obtaining fluid flow rate (or flow velocity) measurements after opening the shut-off valve (ACT 408). The method 400 can include checking for a leak event based on the fluid flow rate (or flow velocity) measurements (ACT 410).

The leak detection device (or system) 100 can use method 400 alone or in combination with one of the implementations of method 300 described with regard to FIG. 3 for fluid leak detection. Similar to method 300 of FIG. 3, the method 400 can include the processor checking for normal fluid flow before initiating, and/or throughout, execution of method 400. If a normal flow event (or fluid usage event) is detected, the processor can abort execution of the leak detection method 400 and re-initiate the method 400 at a later time.

The method 400 can include the processor maintaining the shut-off valve 106 at a close state for a predefined time period (ACT 402). The processor can actuate the shut-off valve 106 to switch to the close state, and keep it in the close state for the predefined period of time. Closing the shut-off valve 106 can prevent fluid from flowing downstream. If there is a leak event, the amount of fluid in the expansion tank and/or the pipes located downstream can decrease over the predefined time period. The predefined time period can be defined long enough to allow for the expansion tank to be emptied (or the fluid amount therein to decrease by a significant amount) in the case of existence of a leak event. The predefined time period can be equal to one minute or few minutes, among others.

The method 400 can include the processor obtaining from the flow sensor 104 one or more first flow rate (or flow velocity) measurements while the shut-off valve 106 is in the close state. It is worth noting that due to potential measurement error offset, the flow sensor 104 may measure non-zero flow rate (or non-zero flow velocity) even though the shut-off valve is in the close state. The processor can use the first fluid flow rate (or fluid flow velocity) measurements to determine such offset value for calibrating future fluid flow rate/velocity measurements. The processor may omit acquiring the one or more first fluid flow rate (or fluid flow velocity) measurements, for example, if no calibration is needed or the processor already determined the offset value.

The method can include the leak detection device or the respective processor opening the shut-off valve 106 upon the predefined time period lapsing (ACT 404). In the presence of a fluid leak event and upon opening the shut-off valve 106 again, fluid can flow downstream to make up for the fluid lost through leakage. As such, opening the shut-off valve 106 can lead to a relatively large fluid flow rate/velocity.

The method 400 can include the processor obtaining from the flow sensor 104 fluid flow rate/velocity measurements after opening the shut-off valve (ACT 408). The fluid flow sensor 104, e.g., upon processor command, can generate a plurality (or sequence) of flow rate (or flow velocity) measurements once the shut-off valve is open again. The flow sensor 104 can generate the sequence of flow rate/velocity measurements, for example, over another predefined time period. The other predefined time period can be defined or selected, for example, in a way to allow for refilling the expansion tank if a leak event exists. The processor may compute, using the sequence or plurality of flow rate/velocity measurements, a total amount or volume of fluid flowing downstream during after opining the shut-off valve 106 at step 404.

The method 400 can include checking for a leak event based on second flow rate (or flow velocity) measurements (ACT 408). For example, the processor can compare the one or more first flow rate/velocity measurements acquired while the shut-off valve 106 is closed to the plurality of fluid flow rate/velocity measurements acquired after opening the shut-off valve 106. The processor can detect a leak event if the plurality of fluid flow measurements are substantially higher (e.g., greater than by at least a predefined threshold value) than the one or more first flow rate/velocity measurements. The processor can calibrate the plurality of fluid flow rate/velocity measurements acquired after opening the shut-off valve 106 using the one or more first fluid flow rate/velocity measurements> The processor can compare the calibrated fluid flow rate/velocity measurements to a predefined threshold value. If the calibrated fluid flow rate/velocity measurements exceed the threshold value, the processor can determine existence of a leak event.

The processor may determine the amount of fluid flowing downstream after opening the shut-off valve 106 using the plurality of fluid flow rate/velocity measurements acquired after opening the shut-off valve 106. The processor can multiply each measured value by a time duration separating a pair of consecutive measurements. The processor can compare the computed amount of fluid to the volume of the expansion tank and/or the pipes downstream or to some other predefined volume value. If the processor determines that the amount of fluid flowing downstream after opening the shut-off valve is substantially equal to (e.g., within an error margin) to the volume of the expansion tank and/or the pipes downstream (or some other predefined volume), the processor can determine existence of a leak event.

The processor can receive the predefined volume, e.g., volume of the expansion tank and/or the pipes downstream, through user input or via the client application 204. The leak detection device 100 may instruct a user, e.g., via the client application, to simulate a leak event, and estimate the volume of the expansion tank and/or the pipes connected downstream to the plumbing tailpiece 108 during the simulated leak event. During the simulated leak event, the processor can cause the shut-off valve to close and then instruct the user, e.g., via the client application 204, to open one or more faucets to empty the expansion tank and or the pipes downstream. The user can then close the faucet, and the leak detection device 100 can open the shut-off valve and measure the amount of fluid flowing downstream. The measured fluid amount can be equal to the predefined volume, e.g., volume of the expansion tank and/or the pipes downstream, used by the processor in step 408. In general, various fluid leak events can be simulated as described above to obtain reference measurements, features or characteristics of various leak events for use in method 300 or method 400.

The leak detection device 100 can use historical features or characteristics of flow rate/velocity behavior (e.g., shape, slopes, spikes, among others, of flow rate/velocity functions over time) in the presence or absence of leak events. The processor can extract corresponding features or characteristics from flow rate/velocity measurements acquired at step 408 from the flow sensor 104, and compare the extracted features or characteristics to the corresponding historic features or characteristics accessible to the processor. If a match (e.g., with a predefined error margin) between both features is found, then the processor can determine the existence of a leak event.

Upon detecting a leak event, the processor can automatically cause the shut-off valve 106, e.g., via the microcontroller, to be actuated to the close state to prevent the fluid from leaking. The processor can send a leak alert to the client device 202 and/or the computing device 206 as discussed above with regard to FIG. 3. A user of the client device 202 can verify, whenever possible, if there is a leak and respond via the client application 204 either to confirm or deny the existence of the leak event. In some implementations, the leak detection device 100 may execute the method 400 if the user denies the existence of a leak event detected using method 300.

The leak detection device 100 may use a combination of both methods 300 and 400 to detect leak events. For instance, the leak detection device 100 can obtain the first pressure measurements (ACT 302), and then close the shut-off valve 106 (ACTs 306 and 402). While the shut-off valve 106 is closed, the leak detection device 100 can obtain the second pressure measurements (ACT 308) and the one or more first fluid flow rate/velocity measurements. After opening the shut-off valve 106 again (ACTs 310 and 404), the leak detection device 100 can acquire both the third pressure measurements (ACT 316) and the plurality of flow rate/velocity measurements (ACT 406). The processor can then check for a leak detection event based on a combination of the first, second and third pressure measurements and the plurality of fluid flow rate/velocity measurements acquired at step 406.

It should be understood that the systems described above may provide multiple ones of any or each of those components and these components may be provided on either a standalone machine or, in some embodiments, on multiple machines in a distributed system. In addition, the systems, methods, and engines described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C #, PROLOG, or in any byte code language such as JAVA. The software programs or executable instructions may be stored on or in one or more articles of manufacture as object code.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

While the invention has been particularly shown and described with reference to specific embodiments, it should be understood by those skilled in the art that various changes in form and detail may be made therein without departing from the spirit and scope of the invention as defined by the following claims. For example, the manifolds disclosed herein may be used to monitor flow rates of fluids other than water, such as oil, gasoline, etc.

What is claimed is:

1. A leak detection system comprising:
a pressure sensor measuring pressure of fluid within a hollow structure;
a fluid flow sensor measuring at least one of a fluid flow rate, a fluid flow velocity, or a fluid flow event duration;
a shut-off valve having an open state allowing fluid to enter the hollow structure and a closed state blocking fluid from entering the hollow structure; and
electric circuitry in communication with the pressure sensor and the shut-off valve and comprising one or more processors and one or more storage devices on which are stored instructions that are operable, when executed by the electric circuitry, to cause the electric circuitry to perform operations comprising:
obtaining, from the fluid flow sensor, a plurality of fluid flow measurements of the fluid in the hollow structure measured while the shut-off valve is in the open state;
determining whether the plurality of fluid flow measurements measured while the shut-off valve is in the open state do not satisfy at least one fluid flow signature and pressure measurements should be obtained, wherein the pressure measurements would not be obtained if the plurality of fluid flow measurements satisfy the at least one fluid flow signature;
detecting, using a result of the determination whether the plurality of fluid flow measurements measured while the shut-off valve is in the open state do not satisfy the at least one fluid flow signature, an abnormal fluid flow and that pressure measurements should be obtained,
in response to detecting the abnormal fluid flow and that pressure measurements should be obtained, obtaining, from the pressure sensor, a plurality of pressure measurements of the fluid in the hollow structure measured while the shut-off valve is in the closed state;
obtaining, from the pressure sensor, a different plurality of pressure measurements of the fluid in the hollow structure measured while the shut-off valve is in the open state;
determining that the plurality of pressure measurements measured while the shut-off valve is in the closed state change in a uniform direction indicating a pressure decrease over time, wherein determining that the plurality of pressure measurements measured while the shut-off valve is in the closed state change in the uniform direction indicating the pressure decrease over time uses one or more line fitting methods;
determining that the different plurality of pressure measurements measured while the shut-off valve is in the open state change in another uniform direction indicating a pressure increase over time, wherein determining that the different plurality of pressure measurements measured while the shut-off valve is in the open state change in the other uniform direction indicating the pressure increase over time uses one or more line fitting methods; and
identifying a fluid leak event in response to i) determining the pressure decrease over time of the plurality of pressure measurements while the shut-off valve is in the closed state, and ii) determining the pressure increase over time of the different plurality of pressure measurements while the shut-off valve is in the open state.

2. The leak detection system of claim 1, wherein identifying the fluid leak event comprises:
comparing the plurality of pressure measurements to the different plurality of pressure measurements; and
identifying the fluid leak event upon determining that the plurality of pressure measurements are less than the different plurality of pressure measurements by a difference greater than a predefined threshold value.

3. The leak detection system of claim 1, wherein the operations comprise:
actuating the shut-off valve to switch to the open state after obtaining the plurality of pressure measurements; and
obtaining the different plurality of pressure measurements of the fluid after actuating the shut-off valve.

4. The leak detection system of claim 3, wherein identifying the fluid leak event comprises:
identifying the fluid leak event based on a negative slope or a degree of decrease of the plurality of pressure measurements over time, or based on characteristics of a function associated with the plurality of pressure measurements over time.

5. The leak detection system of claim 3, wherein identifying the fluid leak event comprises:
maintaining the shut-off valve in the open state prior to obtaining the plurality of pressure measurements;
obtaining, prior to obtaining the plurality of pressure measurements, an initial plurality of pressure measurements of the fluid after causing the shut-off valve to switch to the open state;
actuating the shut-off valve to switch to the closed state after obtaining the initial plurality of pressure measurements; and
identifying the fluid leak event based on the initial plurality of pressure measurements, the plurality of pressure measurements, and the different plurality of pressure measurements.

6. The leak detection system of claim 5, wherein identifying the fluid leak event comprises:
comparing the plurality of pressure measurements to the different plurality of pressure measurements;
comparing the plurality of pressure measurements to the initial plurality of pressure measurements; and
identifying the fluid leak event upon determining that (i) the plurality of pressure measurements are less than the different plurality of pressure measurements by a first difference greater than a first predefined threshold value and (ii) the plurality of pressure measurements are less than the initial plurality of pressure measurements by a second difference greater than a second predefined threshold value.

7. The leak detection system of claim 5, wherein identifying the fluid leak event is (i) based on a positive slope or a first degree of increase of the plurality of pressure measurements over time and a negative slope or a second degree of decrease of the different plurality of pressure measurements over time, or (ii) based on characteristics of a function associated with the plurality of pressure measurements and the different plurality of pressure measurements over time.

8. The leak detection system of claim 1, wherein identifying the fluid leak event comprises:
identifying the fluid leak event based on characteristics of a function associated with the plurality of pressure measurements over time.

9. The leak detection system of claim 1, wherein identifying the fluid leak event comprises:

actuating the shut-off valve to switch to a second open state to allow the fluid to flow through the hollow structure after obtaining the plurality of pressure measurements;

obtaining a plurality of fluid flow rate measurements after actuating the shut-off valve to switch to the second open state;

estimating, using the plurality of fluid flow rate measurements, a fluid volume indicative of an amount of fluid flowing through the hollow structure after causing the shut-off valve to switch to the second open state;

comparing the fluid volume to a predefined fluid volume value; and identifying the fluid leak event further based on the comparison of the fluid volume to the predefined fluid volume value.

10. The leak detection system of claim 1, wherein:

determining that the plurality of pressure measurements indicate a pressure decrease over time comprises determining, using the one or more line fitting methods, that a line for the plurality of pressure measurements measured while the shut-off valve is in the closed state has a negative slope indicating the pressure decrease over time; and determining that the different plurality of pressure measurements indicate a pressure increase over time comprises determining, using the one or more line fitting methods, that the different plurality of pressure measurements measured while the shut-off valve is in the open state has a positive slope indicating the pressure increase over time.

11. The leak detection system of claim 1, wherein identifying the fluid leak event is responsive to i) determining that the plurality of pressure measurements measured while the shut-off valve is in the closed state change in the uniform direction indicating a pressure decrease over time and ii) determining that the different plurality of pressure measurements measured while the shut-off valve is in the open state change in the other uniform direction indicating a pressure increase over time.

12. A method of leak detection comprising:

obtaining, from a fluid flow sensor measuring at least one of a fluid flow rate, a fluid flow velocity, or a fluid flow event duration, a plurality of fluid flow measurements of the fluid in a hollow structure measured while a shut-off valve is in an open state;

determining whether the plurality of fluid flow measurements measured while the shut-off valve is in the open state do not satisfy at least one fluid flow signature and pressure measurements should be obtained, wherein the pressure measurements would not be obtained if the plurality of fluid flow measurements satisfy the at least one fluid flow signature;

detecting, using a result of the determination whether the plurality of fluid flow measurements measured while the shut-off valve is in the open state do not satisfy the at least one fluid flow signature, an abnormal fluid flow and that pressure measurements should be obtained, in response to detecting the abnormal fluid flow and that pressure measurements should be obtained, obtaining, by a pressure sensor, a plurality of pressure measurements of a fluid in a hollow structure measured while a shut-off valve is in a closed state;

obtaining, by the pressure sensor, a different plurality of pressure measurements of the fluid measured while the shut-off valve is in the open state;

determining that the plurality of pressure measurements measured while the shut-off valve is in the closed state change in a uniform direction indicating a pressure decrease over time, wherein determining that the plurality of pressure measurements measured while the shut-off valve is in the closed state change in the uniform direction indicating the pressure decrease over time uses one or more line fitting methods;

determining that the different plurality of pressure measurements measured while the shut-off valve is in the open state change in another uniform direction indicating a pressure increase over time, wherein determining that the different plurality of pressure measurements measured while the shut-off valve is in the open state change in the other uniform direction indicating the pressure increase over time uses one or more line fitting methods; and identifying a fluid leak event in response to i) determining the pressure decrease over time of the plurality of pressure measurements while the shut-off valve is in the closed state, and ii) determining the pressure increase over time of the different plurality of pressure measurements while the shut-off valve is in the open state.

13. The method of claim 12, wherein identifying the fluid leak event comprises:

comparing the plurality of pressure measurements to the different plurality of pressure measurements; and identifying the fluid leak event upon determining that the plurality of pressure measurements are less than the different plurality of pressure measurements by a difference greater than a predefined threshold value.

14. The method of claim 12, wherein obtaining the different plurality of pressure measurements comprises:

actuating the shut-off valve to switch to the open state after obtaining the plurality of pressure measurements; and obtaining, by the pressure sensor, the different plurality of pressure measurements of the fluid after actuating the shut-off valve.

15. The method of claim 14, wherein identifying the fluid leak event comprises:

identifying the fluid leak event based on (i) a negative slope or a degree of decrease of the plurality of pressure measurements over time, or (ii) characteristics of a function associated with the plurality of pressure measurements over time.

16. The method of claim 14, wherein identifying the fluid leak event comprises:

maintaining the shut-off valve in the open state prior to obtaining the plurality of pressure measurements;

obtaining, by the pressure sensor, an initial plurality of pressure measurements of the fluid after causing the shut-off valve to switch to the open state;

actuating the shut-off valve to switch to the closed state after obtaining the initial plurality of pressure measurements; and identifying the fluid leak event based on the initial plurality of pressure measurements, the plurality of pressure measurements, and the different plurality of pressure measurements.

17. The method of claim 16, wherein identifying the fluid leak event comprises:

comparing the initial plurality of pressure measurements to the plurality of pressure measurements;

comparing the plurality of pressure measurements to the different plurality of pressure measurements; and identifying the fluid leak event upon determining that (i) the plurality of pressure measurements are less than the initial plurality of pressure measurements by a first difference greater than a first predefined threshold value, and (ii) the plurality of pressure measurements are less than the different plurality of pressure measurements by a second difference greater than a second predefined threshold value.

18. The method of claim 16, wherein identifying the fluid leak event comprises:

identifying the fluid leak event (i) based on a positive slope or a first degree of increase of the different plurality of pressure measurements over time and a negative slope or a second degree of decrease of the plurality of pressure measurements over time, or (ii) based on characteristics of a function associated with the plurality of pressure measurements and the different plurality of pressure measurements over time.

19. The method of claim 12, wherein identifying the fluid leak event comprises:

Identifying the fluid leak event based on characteristics of a function associated with the plurality of pressure measurements over time.

20. The method of claim 12, wherein identifying the fluid leak event comprises:

actuating the shut-off valve to switch to a second open state to allow the fluid to flow through the hollow structure after obtaining the plurality of pressure measurements;

generating, by the pressure sensor, a plurality of fluid flow rate measurements after actuating the shut-off valve to switch to the second open state;

estimating and using the plurality of fluid flow rate measurements, a fluid volume indicative of an amount of fluid flowing through the hollow structure after causing the shut-off valve to switch to the second open state;

comparing the fluid volume to a predefined fluid volume value; and identifying the fluid leak event further based on the comparison of the fluid volume to the predefined fluid volume value.

21. A non-transitory computer storage medium encoded with instructions that, when executed by one or more computers, cause the one or more computers to perform operations comprising:

obtaining, from a fluid flow sensor measuring at least one of a fluid flow rate, a fluid flow velocity, or a fluid flow event duration, a plurality of fluid flow measurements of a fluid in a hollow structure measured while a shut-off valve is in an open state;

determining whether the plurality of fluid flow measurements measured while the shut-off valve is in the open state do not satisfy at least one fluid flow signature and pressure measurements should be obtained, wherein the pressure measurements would not be obtained if the plurality of fluid flow measurements satisfy the at least one fluid flow signature;

detecting, using a result of the determination whether the plurality of fluid flow measurements measured while the shut-off valve is in the open state do not satisfy the at least one fluid flow signature, an abnormal fluid flow and that pressure measurements should be obtained, in response to detecting the abnormal fluid flow and that pressure measurements should be obtained, obtaining, from a pressure sensor, a plurality of pressure measurements of a fluid in a hollow structure measured while a shut-off valve is in a closed state;

obtaining, from the pressure sensor, a different plurality of pressure measurements of the fluid in the hollow structure measured while the shut-off valve is in the open state;

determining that the plurality of pressure measurements measured while the shut-off valve is in the closed state change in a uniform direction indicating a pressure decrease over time, wherein determining that the plurality of pressure measurements indicate a pressure decrease over time comprises determining, using one or more line fitting methods, that a line for the plurality of pressure measurements measured while the shut-off valve is in the closed state has a negative slope indicating the pressure decrease over time;

determining that the different plurality of pressure measurements measured while the shut-off valve is in the open state change in another uniform direction indicating a pressure increase over time, wherein determining that the different plurality of pressure measurements measured while the shut-off valve is in the open state change in the other uniform direction indicating the pressure increase over time uses the one or more line fitting methods; and identifying a fluid leak event in response to i) determining that the plurality of pressure measurements measured while the shut-off valve is in the closed state change in the uniform direction indicating a pressure decrease over time using the one or more line fitting methods, and ii) determining that the different plurality of pressure measurements measured while the shut-off valve is in the open state change in the other uniform direction indicating a pressure increase over time using the one or more line fitting methods.

* * * * *